United States Patent
Iwabuchi et al.

(10) Patent No.: US 8,820,816 B2
(45) Date of Patent: Sep. 2, 2014

(54) OUTER PANEL FOR BACK DOOR

(75) Inventors: Masayoshi Iwabuchi, Chikusei (JP);
Shigeo Suzuki, Chikusei (JP); Takashi Yokoo, Chikusei (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 13/468,023

(22) Filed: May 9, 2012

(65) Prior Publication Data
US 2012/0286539 A1 Nov. 15, 2012

(30) Foreign Application Priority Data

May 13, 2011 (JP) ................ P2011-108230

(51) Int. Cl.
*B60J 1/00* (2006.01)
(52) U.S. Cl.
USPC ................... 296/96.21; 296/146.2
(58) Field of Classification Search
CPC ...... B60J 10/0062; B60J 10/008; B60J 1/005; B60J 1/006
USPC ............ 296/85, 84.1, 90, 93, 96.21, 146.15, 296/200, 201, 146.2, 146.8
See application file for complete search history.

(56) References Cited

U.S. PATENT DOCUMENTS

| | | | | |
|---|---|---|---|---|
| 5,531,496 A | * | 7/1996 | Zbinden et al. | 296/96.21 |
| 6,263,627 B1 | * | 7/2001 | Schonenbach et al. | 52/208 |
| 6,378,931 B1 | * | 4/2002 | Kolluri et al. | 296/146.15 |
| 6,460,917 B2 | * | 10/2002 | De Paoli | 296/201 |
| 6,637,164 B2 | * | 10/2003 | Kondo et al. | 52/208 |
| 6,638,075 B2 | * | 10/2003 | Spaulding et al. | 439/34 |
| 6,826,876 B2 | * | 12/2004 | Brandner | 52/204.597 |
| 6,869,128 B2 | * | 3/2005 | Farrar et al. | 296/146.16 |
| 7,114,760 B2 | * | 10/2006 | Cameron | 296/152 |
| 7,637,554 B2 | * | 12/2009 | Kurokawa et al. | 296/146.15 |

FOREIGN PATENT DOCUMENTS

| | | |
|---|---|---|
| JP | 08-1422665 | 6/1996 |
| JP | 2012201281 A * | 10/2012 |

* cited by examiner

*Primary Examiner* — Jason S Morrow
*Assistant Examiner* — E Turner Hicks
(74) *Attorney, Agent, or Firm* — Miles & Stockbridge P.C.

(57) ABSTRACT

The present invention provides an outer panel for a back door that includes a glass-fitted opening and a plurality of guide grooves provided on an outer peripheral edge of the glass-fitted opening. Each of the guide grooves is arranged on opposing left and right sides on the outer peripheral edge and has a shallow groove and either a deep groove or a through hole.

9 Claims, 2 Drawing Sheets

OUTER PANEL FOR BACK DOOR

BACKGROUND OF THE INVENTION

1. Field of the Invention

The present invention relates to an outer panel for a back door for an automobile.

2. Related Background Art

Conventionally, in order to achieve wide rearward visibility, for example, back-door glass is bonded in the following manner (for example, see Japanese Patent Application Laid-Open Publication No. 8-142665). An outer panel having an opening (hereinafter referred to as "glass-fitted opening") having back-door glass (hereinafter simply referred to as "glass") fitted therein and an inner panel for a back door are joined together to form a window frame for a rear window. Annular inner and outer protrusions are formed along an outer peripheral edge of the window frame. A concave portion sandwiched between the inner and outer protrusions serves as an adhesive groove in which an adhesive is accommodated.

The outer panel for a back door is integrated with a spoiler. The spoiler is often formed in such a shape that smoothly descends from the height of the automobile roof and partially lies over an upper portion of the glass. In other words, when the automobile is viewed from the back, an adhesive joint at an upper portion of the glass-fitted opening is hidden behind the spoiler. On the other hand, for easiness of operation, the back-door glass is generally installed in the outer panel by applying an adhesive on the inner peripheral edge of the glass and thereafter affixing the glass at the adhesive joint on the outer periphery of the glass-fitted opening, from the vertical direction of the outer panel placed on the horizontal plane. However, in the outer panel having the spoiler, the glass cannot be installed in the outer panel placed on the horizontal plane from the vertical direction because the spoiler hides the adhesive joint on the upper side of the glass-fitted opening of the back door. Therefore, a special jig has to be used to install the glass while avoiding the spoiler.

SUMMARY OF THE INVENTION

The present invention provides an outer panel for a back door in which glass can be installed in the outer panel from the vertical direction of the outer panel so that back-door glass can be easily installed without the need for using a special jig.

An outer panel for a back door according to an aspect of the present invention is as follows.

(1) An outer panel for a back door includes a glass-fitted opening and a plurality of guide grooves provided on an outer peripheral edge of the glass-fitted opening. The plurality of guide grooves is arranged along each of opposing left and right sides on the outer peripheral edge. Each of the guide grooves has a shallow groove and either a deep groove or a through hole.

(2) In the outer panel for a back door in (1) above, of the plurality of guide grooves arranged along each of the opposing left and right sides on the outer peripheral edge of the glass-fitted opening, at least a left and right pair of the guide grooves have the shallow grooves having a same depth and either the deep grooves having a same depth or the through holes.

(3) In the outer panel for a back door in (1) or (2) above, of the plurality of guide grooves arranged along each of the opposing left and right sides on the outer peripheral edge of the glass-fitted opening, at least a left and right pair of the guide grooves are arranged in left-right symmetry.

(4) In the outer panel for a back door in (1) or (3) above, the plurality of guide grooves arranged along each of the opposing left and right sides on the outer peripheral edge of the glass-fitted opening have the shallow grooves having a same depth in all the guide grooves and either the deep grooves having a same depth in all the guide grooves or the through holes.

(5) The outer panel for a back door in (1) or (2) above also includes glass that closes the glass-fitted opening. The glass has a protrusion inserted into each of the guide grooves. A height of the protrusion is greater than a sum of a depth of the shallow groove of the guide groove and a thickness of an adhesive layer applied on the glass.

The present invention can provide an outer panel for a back door in which glass can be installed in the outer panel from the vertical direction of the outer panel so that back-door glass can be easily installed without the need for using a special jig.

BRIEF DESCRIPTION OF THE DRAWINGS

FIG. 2(a) shows the glass before being installed and FIG. 2(b) shows the glass after being installed.

DESCRIPTION OF THE PREFERRED EMBODIMENTS

Figure 1:
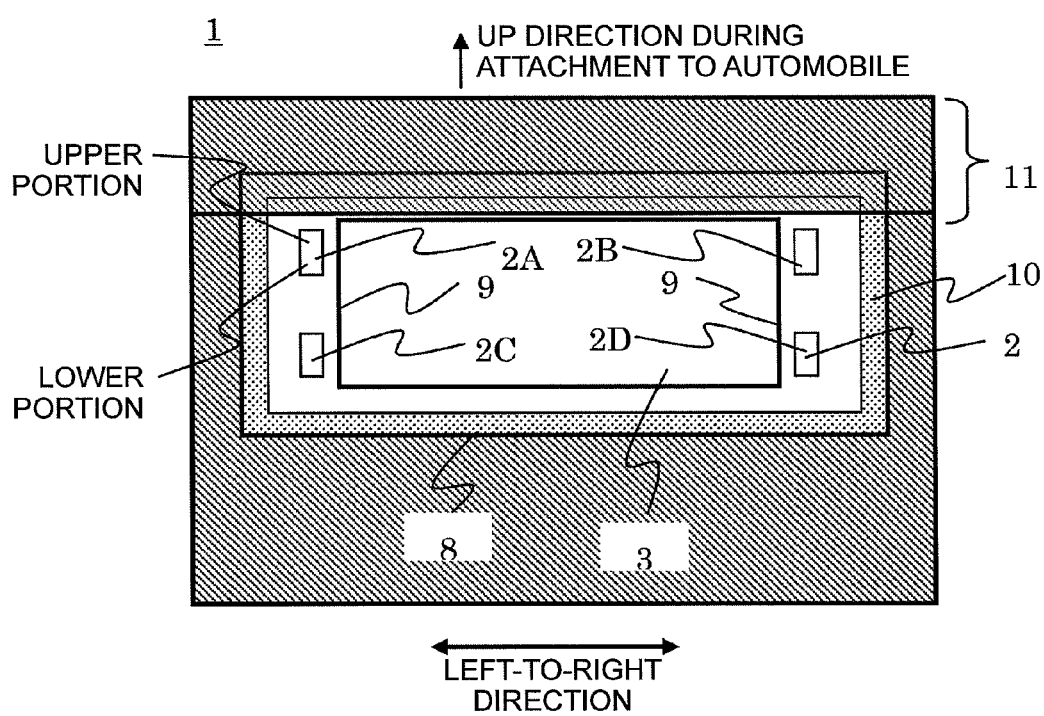
FIG. 1 schematically shows a plan view of an outer panel for a back door according to an embodiment.
Figure 2:
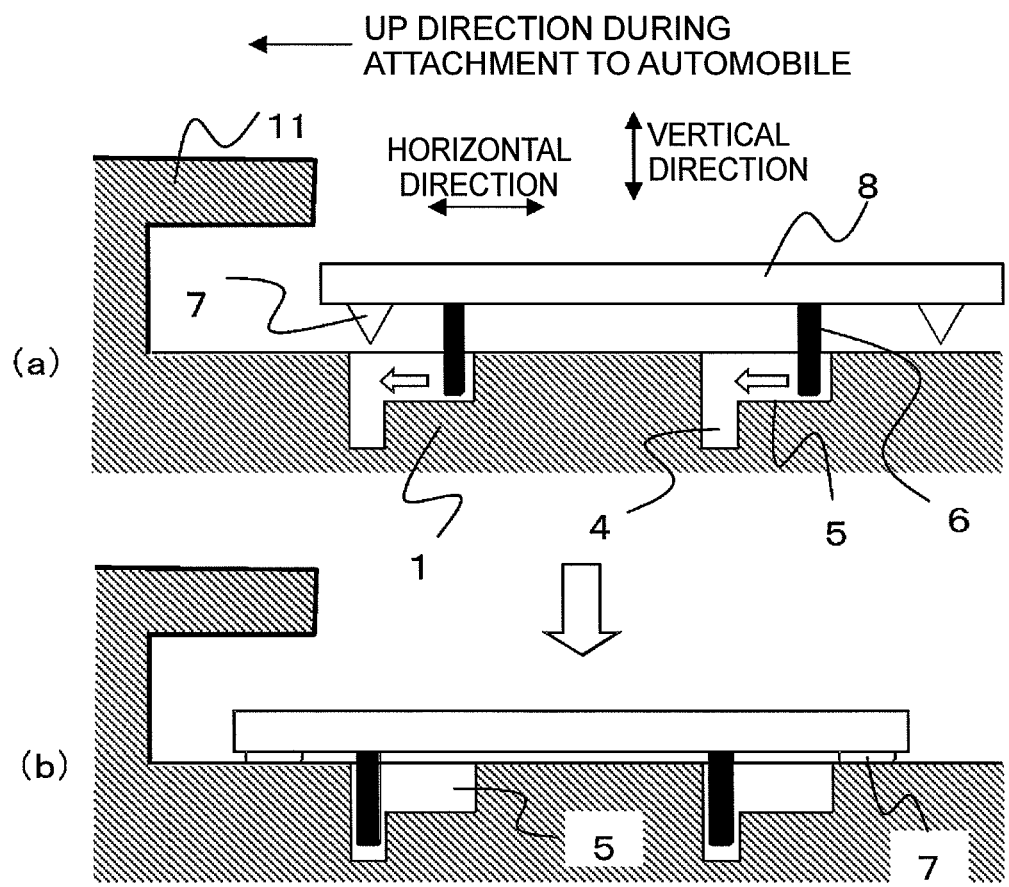
FIG. 2 is a cross-sectional view of guide grooves surrounding a glass-fitted opening when the outer panel for a back door according to the embodiment is viewed from the side, where

An example of an outer panel for a back door (hereinafter referred to as "outer panel") may have a glass-fitted opening 3 and guide grooves 2 provided on an outer peripheral edge of the glass-fitted opening 3, as shown in FIG. 1 and FIG. 2. A plurality of guide grooves 2 is arranged along opposing left and right sides 9 on the outer peripheral edge. Each guide groove 2 includes a shallow groove 5 and a deep groove 4. The deep groove 4 may be a through hole.

The back door refers to a door arranged at the rear of an automobile. The back door is fixed so as to be able to open/close using a hinge or the like at the rear of an automobile. The back door can be formed by affixing the inner panel and the outer panel having the glass-fitted opening together, then aligning an inner peripheral edge of the glass having an adhesive applied thereon with an adhesive joint on an outer periphery of the glass-fitted opening, and installing the glass in the outer panel so as to close the glass-fitted opening.

The outer panel refers to an automobile exterior member in a configuration of the back door. The inner panel refers to an automobile interior member in a configuration of the back door. For example, the outer panel and the inner panel can be formed by press-forming a metal plate or resin material using a die. The resin material is not specifically limited, and a material made of a generally-used polypropylene resin composition may be used. The outer panel intended in the present invention is not specifically limited as long as glass is installed therein. For example, the outer panel may have a spoiler and may be formed such that the spoiler partially lies over the adhesive joint at the upper portion of the glass-fitted opening. In other words, when the automobile is viewed from the back, part (mainly, the upper portion) of the adhesive joint on the outer periphery of the glass-fitted opening is hidden behind the spoiler.

The glass-fitted opening refers to an opening provided at a position of the outer panel where glass is intended to be installed. Guide grooves are provided on the outer peripheral edge of the glass-fitted opening of the outer panel. The adhesive joint is provided on the outer periphery of the glass-fitted opening, which is the outside of the guide grooves. The adhesive joint refers to a portion of the outer panel at which the glass and the outer panel are affixed together with an adhesive applied on the inner peripheral edge of the glass.

The glass refers to glass for a back door for closing the glass-fitted opening. The glass is installed at the adhesive joint provided on the outer periphery of the glass-fitted opening of the outer panel, with the adhesive applied on the inner peripheral edge of the glass. The glass has a protrusion such as a guide pin. The material of the protrusion may be the same as the glass, or a different material such as metal or resin may be used. Although not being limited, the resin may be a material made of a generally-used polypropylene composition. The protrusion can be fixed to the glass, for example, by bonding using an adhesive or the like or by fusing with heat.

The guide groove refers to a concave portion provided on the outer peripheral edge of the glass-fitted opening of the outer panel such that the protrusion of the glass is inserted therein. The guide groove can be formed simultaneously when the outer panel is press-formed or later using a router or the like. The guide groove is formed so as to have at least two level depths including a relatively shallow portion (hereinafter referred to as "shallow groove") and a relatively deep portion (hereinafter referred to as "deep groove").

The shallow groove is a portion that temporarily receives the protrusion of the glass and guides the protrusion to the deep groove. Even in the state in which the protrusion is inserted, the protrusion is movable in the horizontal direction in the shallow groove. The deep groove is a portion that positions and fixes the protrusion of the glass at the final installation position. In the state in which the protrusion is inserted, the movement of the protrusion in the horizontal direction is fixed. Thus, when the glass is to be fixed to the outer periphery of the glass-fitted opening of the outer panel, the protrusion of the glass is temporarily inserted into the shallow groove of the outer panel and then inserted into the deep groove at the point of time when the protrusion moved in the horizontal direction reaches the deep groove. Accordingly, the glass can be installed at a prescribed position of the outer panel. Therefore, even in the case where, for example, the spoiler hinders the installation at a prescribed installation position (the adhesive joint on the outer periphery of the glass-fitted opening) from the vertical direction of the outer panel, the glass can be fixed at the prescribed installation position by temporarily inserting the protrusions of the glass from the vertical direction into the shallow grooves located where the spoiler of the outer panel does not hinder, and then by sliding the protrusions in the horizontal direction to insert the protrusions into the deep grooves. Therefore, the glass can be installed in the outer panel from the vertical direction with respect to the outer panel, which eliminates the need for using a special jig and facilitates the installation of the back-door glass.

The arrangement of the shallow groove and the deep groove of the guide groove may be an up/down, left/right, or oblique direction, depending on the manner of installation. Preferably, the shallow groove is a lower portion and the deep groove is an upper portion.

Here, the upper portion refers to a portion located in the upper direction in one guide groove when the outer panel is attached to an automobile. On the other hand, the lower portion refers to a portion located in the lower direction in one guide groove. Thus, even when the spoiler hides the adhesive joint on the upper side of the glass-fitted opening of the back door, the glass can be fixed at a prescribed installation position hidden by the spoiler, by temporarily inserting the protrusions of the glass into the shallow grooves on the lower side of the glass-fitted opening from the vertical direction of the outer panel placed on the horizontal plane, and then sliding the glass upward to insert the protrusions into the deep grooves.

Preferably, of the plurality of guide grooves arranged along each of the opposing left and right sides on the outer peripheral edge of the glass-fitted opening, at least a pair of left and right guide grooves have the shallow grooves with the same depth and either the deep grooves with the same depth or the through holes. For example, in the example shown in FIG. 1, the guide grooves of at least one of a pair of left and right guide grooves 2A and 2B, a pair of left and right guide grooves 2C and 2D, a pair of left and right guide grooves 2A and 2D, and a pair of left and right guide grooves 2B and 2C have the shallow grooves with the same depth and either the deep grooves with the same depth or the through holes. More preferably, of the plurality of guide grooves arranged along each of the opposing left and right sides on the outer peripheral edge of the glass-fitted opening, at least a pair of left and right guide grooves are arranged in left-right symmetry with respect to the center line in the left-to-right direction of the glass-fitted opening. For example, in the example shown in FIG. 1, a pair of left and right guide grooves 2A and 2B are arranged in left-right symmetry, and a pair of left and right guide grooves 2C and 2D are arranged in left-right symmetry. The guide grooves of at least one of a pair of left and right guide grooves 2A and 2B arranged in left-right symmetry and a pair of left and right guide grooves 2C and 2D arranged in left-right symmetry have the shallow grooves with the same depth and either the deep grooves with the same depth or the through holes. In general, the shape of the outer panel in the vicinity of the outer peripheral edge of the glass-fitted opening where the guide grooves are arranged is often formed in left-right symmetry, and the glass is also formed in conformity with the shape of the outer panel. Therefore, if the shallow grooves of a pair of left and right guide grooves have the same depth, when the protrusions of the glass made to have the same height are inserted into the shallow grooves of the guide grooves of the outer panel, the glass can be kept parallel with respect to the outer panel in the left-to-right direction. In other words, a separation distance for preventing contact between the outer panel and the adhesive applied on the glass can be kept uniform in the left-to-right direction. On the other hand, if the deep grooves of a pair of left and right guide grooves have the same depth, when the protrusions of the glass are inserted into the deep grooves, the glass can be kept parallel with respect to the outer panel in the left-to-right direction. In other words, the thickness of the adhesive can be kept uniform in the left-to-right direction when the outer panel and the glass are bonded together with the adhesive applied on the glass. In a case where the depth of the deep groove of the guide groove is deeper than the height of the protrusion of the glass or where the deep groove is a through hole, the glass and the outer peripheral edge of the glass-fitted opening of the outer panel can be brought into intimate contact with each other with the adhesive interposed therebetween.

Further preferably, the guide groove has the shallow groove having the same depth in all the guide grooves, the deep groove having the same depth in all the guide grooves, or a through hole. In other words, it is further preferable that the shallow groove or the deep groove should have the same depth in all the guide grooves. For example, in the example shown in FIG. 1, the shallow grooves or the deep grooves have the same depth in all the guide grooves 2A, 2B, 2C, and 2D.

Thus, a plurality of protrusions provided on the glass is made to have the same height corresponding to the guide grooves of the outer panel, whereby when the protrusions of the glass are inserted into the shallow grooves of the guide grooves of the outer panel, the glass can be kept parallel with respect to the outer panel. Therefore, a separation distance for preventing contact between the outer panel and the adhesive applied on the glass can be kept uniform in the left-to-right direction. In addition, application of non-uniform force on the glass can be prevented, and the glass is not skewed with respect to the guide grooves. Therefore, the glass can be moved easily in the horizontal direction. When the protrusions are inserted into the deep grooves, the glass can be kept parallel with respect to the outer panel. Therefore, the thickness of the adhesive can be kept uniform when the outer panel and the glass are bonded together with the adhesive applied on the glass. In the case where the depth of the deep groove of the guide groove is deeper than the height of the protrusion of the glass or where the deep groove is a through hole, the glass and the outer peripheral edge of the glass-fitted opening of the outer panel can be brought into intimate contact with the adhesive interposed therebetween.

The height of the protrusion provided on the glass is preferably greater than the sum of the depth of the shallow groove of the guide groove and the thickness of the adhesive layer applied on the glass. Thus, when the protrusions of the glass are inserted into the shallow grooves of the guide grooves of the outer panel, the distance can be kept between the outer panel and the adhesive applied on the inner peripheral edge of the glass, thereby preventing the adhesive from adhering to an unnecessary part. On the other hand, when the protrusions are inserted into the deep grooves, the outer panel and the glass come into intimate contact with each other reliably, thereby preventing such a problem as floating during installation.

An example of the outer panel for a back door in the present invention will be described below using the drawings. As shown in FIG. 1, an outer panel 1 for a back door in the present invention has a plurality of guide grooves 2 arranged along a pair of opposing left and right sides of a glass-fitted opening 3. It is preferable that the guide groove 2 should be 50 to 100 mm in the longitudinal direction and 10 to 15 mm in the lateral direction although the length and width of the guide groove 2 is not specifically limited. The guide grooves 2 have shallow grooves all having the same depth and deep grooves all having the same depth or through holes. Preferably, the depth of the shallow groove is 5 to 15 mm, and the depth of the deep groove is 6 to 25 mm. A plurality of guide grooves 2 is arranged along each of the left and right sides of the opening 3. Preferably, two to five guide grooves 2 are arranged on each side. More preferably, two to three are arranged on each side. The ratio (dimensional ratio) between the shallow groove and the deep groove in the guide groove 2 is preferably such that the shallow groove/the deep groove=80/20 to 50/50 in the longitudinal direction.

FIG. 2 shows a cross-sectional view of the guide grooves surrounding the glass-fitted opening in the outer panel 1 for a back door in the present invention. As shown in FIG. 2(a), guide pins (protrusions) 6 are fitted into shallow grooves 5 and then slid toward deep grooves 4. Then, as shown in FIG. 2(b), the guide pins (protrusions) 6 fall into the deep grooves 4, and glass 8 and the outer panel 1 are bonded together at a prescribed position with an adhesive 7. It is preferable that the height of the guide pin (protrusion) 6 should be greater than the sum of the depth of the shallow grove of the guide groove and the thickness of the adhesive applied on the glass. Furthermore, it is preferable that the height of the guide pin 6 should be smaller than the depth of the deep groove of the guide groove. Therefore, as the thickness of the adhesive is generally 4 to 5 mm, the height of the guide pin (protrusion) 6 is preferably 10 to 20 mm.

EXAMPLE 1

Preferred examples of the present invention will be described below although the present invention is not limited to these examples.

An outer panel for a back door having an approximately rectangular glass-fitted opening having a length of 500 mm and a width of 1200 mm was prepared. On the outer peripheral edge of the glass-fitted opening, two guide grooves were arranged on each of the opposing left and right sides. Each guide groove had a width of 15 mm and a length of 100 mm (in the longitudinal direction). Each guide groove had a shallow groove and a deep groove. The shallow groove had a width of 15 mm, a length of 80 mm, and a depth of 5 mm. The deep groove had a width of 15 mm, a length of 20 mm, and a depth of 20 mm. A plurality of guide grooves arranged on each of the opposing left and right sides on the outer peripheral edge of the glass-fitted opening was all arranged in parallel in the longitudinal direction. The shallow groove was located at the lower portion of the guide groove.

An adhesive (a one-part urethane adhesive manufactured by the Yokohama Rubber Co., Ltd.) was applied at a thickness of 7 mm at a prescribed position of glass having four guide pins located so as to be fitted into the guide grooves of the outer panel for a back door. The guide pin had a height of 15 mm and a diameter of 8 mm. The glass having a length of 510 mm and a width of 1210 mm with the adhesive applied thereon was inserted from the front with the guide pins being fitted into the shallow grooves. The glass was then slid toward the deep grooves, so that the guide pins were fitted into the deep grooves. The glass and the outer panel for a back door were affixed vertically at a prescribed position with the adhesive at the room temperature (25° C.). The thickness of the adhesive layer was 4 mm after affixing.

1: outer panel, 2: guide groove, 3: glass-fitted opening, 4: deep groove, 5: shallow groove, 6: guide pin (protrusion), 7: adhesive, 8: glass, 9: opposing left and right sides, 10: adhesive joint, 11: spoiler, 2A, 2B, 2C, 2D: guide grooves.

What is claimed is:

1. An outer panel for a back door, the outer panel comprising:
 a glass-fitted opening; and
 a plurality of guide grooves provided on an outer peripheral edge of the glass-fitted opening, wherein
 the plurality of guide grooves is arranged such that there are guide grooves along each of opposing left and right sides on the outer peripheral edge, each of the guide grooves having an elongated shallow groove extending longitudinally along, and below a portion of the outer peripheral edge and unobstructedly into either a deeper groove or a through hole.

2. The outer panel for a back door according to claim 1, wherein, at least a left and right pair of the guide grooves have shallow grooves with a same depth and have either deeper grooves with a same depth or through holes.

3. The outer panel for a back door according to claim 1, wherein, of the plurality of guide grooves arranged along each of the opposing left and right sides on the outer peripheral edge of the glass-fitted opening, at least a left and right pair of the guide grooves are arranged in left-right symmetry.

4. The outer panel for a back door according to claim 1, wherein the plurality of guide grooves arranged along each of the opposing left and right sides on the outer peripheral edge of the glass-fitted opening have shallow grooves with a same depth in all the guide grooves and have either deeper grooves with a same depth in all the guide grooves or through holes.

5. The outer panel for a back door according to claim 1, further comprising glass that closes the glass-fitted opening, wherein
the glass has a protrusion inserted into each of the guide grooves and a height of the protrusion is greater than a sum of a depth of the shallow groove of the guide groove and a thickness of an adhesive layer applied on the glass, and wherein
the protrusion is adapted to slide along the elongated shallow groove before entering the deeper groove or through hole.

6. The outer panel for a back door according to claim 2, wherein, of the plurality of guide grooves arranged along each of the opposing left and right sides on the outer peripheral edge of the glass-fitted opening, at least a left and right pair of the guide grooves are arranged in left-right symmetry.

7. The outer panel for a back door according to claim 6, wherein the plurality of guide grooves arranged along each of the opposing left and right sides on the outer peripheral edge of the glass-fitted opening have shallow grooves with a same depth in all the guide grooves and have either deeper grooves with a same depth in all the guide grooves or through holes.

8. The outer panel for a back door according to claim 2, further comprising glass that closes the glass-fitted opening, wherein
the glass has a protrusion inserted into each of the guide grooves and a height of the protrusion is greater than a sum of a depth of the shallow groove of the guide groove and a thickness of an adhesive layer applied on the glass, and wherein
the protrusion is adapted to slide along the elongated shallow groove before entering the deeper groove or through hole.

9. The outer panel for a back door according to claim 3, wherein the plurality of guide grooves arranged along each of the opposing left and right sides on the outer peripheral edge of the glass-fitted opening have shallow grooves with a same depth in all the guide grooves and either deeper grooves with a same depth in all the guide grooves or through holes.

* * * * *